(12) United States Patent
Lee

(10) Patent No.: US 12,202,469 B2
(45) Date of Patent: Jan. 21, 2025

(54) SMART MOBILITY LINK SYSTEM

(71) Applicant: DASAN Networks, Inc., Seongnam-si (KR)

(72) Inventor: Min Ho Lee, Siheung-si (KR)

(73) Assignee: DASAN Networks, Inc., Seongnam-si (KR)

( * ) Notice: Subject to any disclaimer, the term of this patent is extended or adjusted under 35 U.S.C. 154(b) by 201 days.

(21) Appl. No.: 17/219,624

(22) Filed: Mar. 31, 2021

(65) Prior Publication Data

US 2022/0024448 A1    Jan. 27, 2022

(30) Foreign Application Priority Data

Jul. 27, 2020  (KR) .................. 10-2020-0093303

(51) Int. Cl.

| | |
|---|---|
| *B60W 30/06* | (2006.01) |
| *B60W 40/04* | (2006.01) |
| *G01C 21/34* | (2006.01) |
| *G05D 1/00* | (2024.01) |
| *G06F 16/29* | (2019.01) |
| *H04W 4/024* | (2018.01) |
| *H04W 4/40* | (2018.01) |
| *H04W 4/80* | (2018.01) |

(52) U.S. Cl.
CPC .......... *B60W 30/06* (2013.01); *B60W 40/04* (2013.01); *G01C 21/3423* (2013.01); *G05D 1/0016* (2013.01); *G05D 1/0022* (2013.01); *G05D 1/0278* (2013.01); *G06F 16/29* (2019.01); *H04W 4/024* (2018.02); *H04W 4/40* (2018.02); *H04W 4/80* (2018.02); *B60W 2556/50* (2020.02)

(58) Field of Classification Search
None
See application file for complete search history.

(56) References Cited

U.S. PATENT DOCUMENTS

| | | | |
|---|---|---|---|
| 2019/0063947 A1* | 2/2019 | Beaurepaire | G01C 21/3423 |
| 2020/0064149 A1* | 2/2020 | Yuan | G01C 21/3626 |
| 2020/0132494 A1* | 4/2020 | Majima | G01C 21/3484 |
| 2020/0408546 A1* | 12/2020 | Vaughn | G01C 21/3423 |
| 2021/0389137 A1* | 12/2021 | Haban | G01C 21/3438 |
| 2021/0394662 A1* | 12/2021 | Deng | G06Q 10/06315 |

FOREIGN PATENT DOCUMENTS

| | | |
|---|---|---|
| JP | 2012-230001 A | 11/2012 |
| KR | 10-1724211 B1 | 3/2017 |

* cited by examiner

*Primary Examiner* — Christian Chace
*Assistant Examiner* — Shayne M. Gilbertson
(74) *Attorney, Agent, or Firm* — Insight Law Group, PLLC; Seung Lee

(57) ABSTRACT

Provided is a smart mobility link system which provides a travel path through a vehicle terminal installed in a vehicle up to a location at which parking is allowed, and mobility is relayed to a vehicle-carried moving object terminal which is installed in a vehicle-carried moving object over a remaining distance so that the travel path can be continuously provided. Accordingly, a user can be guided through a travel path even in an area in which vehicle travel is not possible without additional manipulation of the user.

16 Claims, 6 Drawing Sheets

SMART MOBILITY LINK SYSTEM

CROSS-REFERENCE TO RELATED APPLICATION(S)

This application claims priority from Korean Patent Application No. 10-2020-0093303, filed on Jul. 27, 2020, in the Korean Intellectual Property Office, the disclosure of which is incorporated herein by reference in its entirety.

BACKGROUND

1. Field

The following description relates to a technology for managing mobility of a moving object and more particularly, to a smart mobility link system.

2. Description of Related Art

When a driver inputs a destination, a navigation system installed in a vehicle calculates a shortest path to the destination or an optimal path bypassing a traffic jam and guides the driver through a travel path to the destination. However, it is not possible to provide a travel path in a specific area, such as a no-vehicle zone or the backwoods, in which a vehicle cannot travel.

Recently, there is an increasing number of people who enjoy leisure activities with electric bikes carried by their vehicles. Accordingly, the present inventor researched a smart mobility link technology for providing a travel path through a vehicle terminal installed in a vehicle up to a location at which parking is allowed and relaying mobility to a vehicle-carried moving object terminal which is installed in a vehicle-carried moving object, such as an electric bicycle or an electric kickboard, over a remaining distance to continuously provide the travel path.

Korean Patent No. 10-1724211 (filed on Mar. 31, 2017) proposes a technology for a travel product developer to provide services, such as tour guides, storytelling, and curation, in a tourist site on the basis of geographic information systems (GISs) and multi-modal navigation systems which support various transportations such as walking, bicycles, buses, vehicles, boats, and planes. However, this technology does not relate to a mobility link between a vehicle terminal and a vehicle-carried moving object terminal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a smart mobility link system which provides a travel path through a vehicle terminal installed in a vehicle up to a location at which parking is allowed and relays mobility to a vehicle-carried moving object terminal which is installed in a vehicle-carried moving object over a remaining distance to continuously provide the travel path.

In one general aspect, a smart mobility link system includes a vehicle terminal including a global positioning system (GPS) part configured to calculate a vehicle location, a memory configured to store geographic information, a geographic information system (GIS) part configured to provide the geographic information stored in the memory, a user input part configured to receive a destination from a user, a controller including a travel path retriever configured to search for a travel path from a current vehicle location calculated by the GPS part to the destination received through the user input part, a parking location determiner configured to determine a parking location at which a vehicle will park in the travel path found by the travel path retriever, a display controller configured to control a vehicle travel path to the parking location determined by the parking location determiner to be displayed on a geographic information map provided by the GIS part, and a remaining path provider configured to provide a remaining path from the parking location to the destination to a vehicle-carried moving object terminal installed in a vehicle-carried moving object carried by the vehicle when the vehicle arrives at the parking location, and a display configured to display the geographic information map including the parking location under control of the controller.

In an additional aspect, the vehicle terminal may further include a short-range wireless communicator configured to wirelessly transmit remaining path information provided by the remaining path provider to the vehicle-carried moving object terminal.

In an additional aspect, the parking location determiner may determine the parking location according to rules for parking location determination.

In an additional aspect, the controller may further include a rule setter configured to set the rules for parking location determination.

In an additional aspect, the rules for parking location determination may include whether parking is allowed, whether a vehicle-carried moving object is allowed, a time limit for arrival at the destination, a vehicle speed limit, and speed of the vehicle-carried moving object.

In an additional aspect, the parking location determiner may determine the parking location in further consideration of traffic situation information.

In an additional aspect, the parking location determiner may change the parking location according to the traffic situation information.

In an additional aspect, the vehicle terminal may further include a mobile communicator configured to receive the traffic situation information from a traffic management server.

In an additional aspect, the controller may further include a navigation part configured to guide the user the vehicle travel path to the parking location.

In an additional aspect, the controller may further include a geographic information updater configured to receive geographic information from a geographic information providing server through the mobile communicator and update the geographic information stored in the memory.

In another general aspect, a smart mobility link system includes a vehicle-carried moving object terminal including a GPS part configured to calculate a vehicle-carried moving object location, a memory configured to store geographic information, a GIS part configured to provide the geographic information stored in the memory, a short-range wireless communicator configured to wirelessly receive a remaining path from a parking location to a destination from a vehicle terminal of a vehicle which carries a vehicle-carried moving object, a controller including a display controller configured to control a travel path from a current vehicle-carried moving object location calculated by the GPS part to the destination included in the remaining path received by the short-range wireless communicator to be displayed on a geographic information map provided by the GIS part, and a display configured to display the geographic information map including the destination under control of the controller.

In an additional aspect, the controller may further include a navigation part configured to guide a user a travel path of the vehicle-carried moving object to the destination.

In an additional aspect, the navigation part may change the travel path of the vehicle-carried moving object according to traffic situation information.

In an additional aspect, the vehicle-carried moving object terminal may further include a mobile communicator configured to receive the traffic situation information from a traffic management server.

In an additional aspect, the controller may further include a location-based service part configured to provide a location-based service regarding surroundings of the current vehicle-carried moving object location on the basis of the geographic information provided by the GIS part.

In an additional aspect, the controller may further include a geographic information updater configured to receive geographic information from a geographic information providing server through the mobile communicator and update the geographic information stored in the memory.

In an additional aspect, the controller may further include an information sharer configured to transmit collection information of the vehicle-carried moving object terminal to the vehicle terminal for sharing.

In an additional aspect, the vehicle-carried moving object terminal may further include an information collector configured to collect the collection information of the vehicle-carried moving object terminal.

In an additional aspect, the collection information of the vehicle-carried moving object terminal may be travel information of the vehicle-carried moving object or exercise information of a vehicle-carried moving object user.

In an additional aspect, the vehicle-carried moving object terminal may be embedded in a battery of the vehicle-carried moving object.

Other features and aspects will be apparent from the following detailed description, the accompanying drawings, and the claims.

Figure 1:
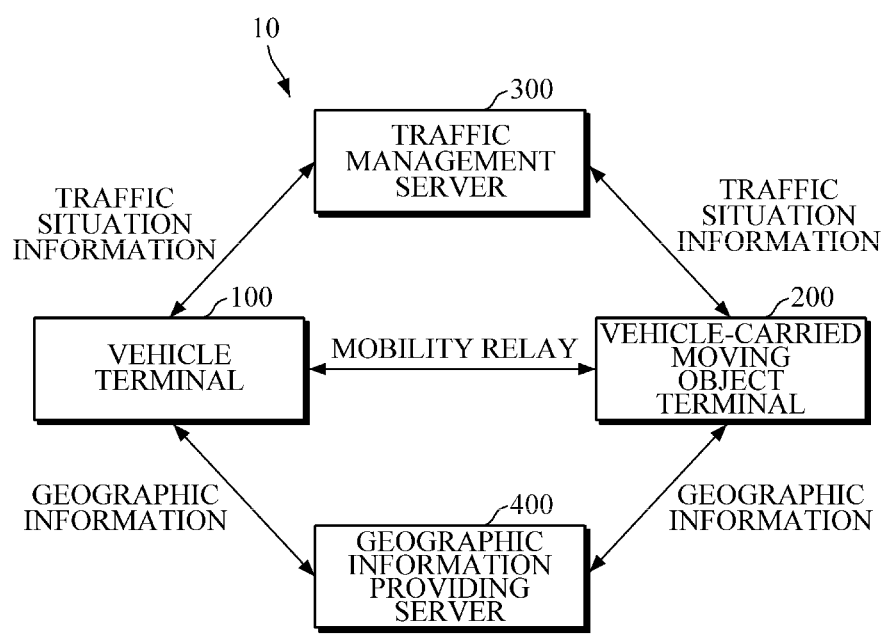
FIG. 1 is a schematic diagram of a smart mobility link system according to the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments of the present invention will be described in detail with reference to the accompanying drawings so that those of ordinary skill in the art may easily understand and implement the present invention. Although particular embodiments are shown in the drawings and detailed descriptions thereof are given, these are not intended to limit various embodiments of the present invention to particular forms.

In describing the present invention, a detailed description of a related known function or element will be omitted when it is deemed to make the gist of the exemplary embodiments of the present invention unclear.

It will be understood that when an element is referred to as being "connected" or "coupled" to another element, it may be directly connected or coupled to the other element or may be connected or coupled to the other element with still another element disposed therebetween.

In contrast, it will be understood when an element is referred to as being "directly connected" or "directly coupled" to another element, there are no intervening elements present.

FIG. 1 is a schematic diagram of a smart mobility link system according to the present invention. As shown in FIG. 1, a smart mobility link system 10 according to the present invention includes a vehicle terminal 100 and a vehicle-carried moving object terminal 200.

The smart mobility link system 10 according to the present invention provides a travel path through the vehicle terminal 100 installed in a vehicle up to a location at which parking is allowed and relays mobility to the vehicle-carried moving object terminal 200 which is installed in a vehicle-carried moving object over a remaining distance to continuously provide the travel path. The vehicle-carried moving object encompasses any moving object such as an electric bicycle and kickboard.

The vehicle terminal 100 installed in the vehicle determines a parking location according to rules for parking location determination, provides a travel path to the determined parking location, and then relays mobility to the vehicle-carried moving object terminal 200 installed in the vehicle-carried moving object to continuously provide the travel path.

Meanwhile, the travel path may be corrected in consideration of traffic situation information provided by a traffic management server 300, and a location-based service may be additionally provided on the basis of geographic information provided by a geographic information providing server 400.

Also, an additional mobility management server (not shown) may be installed to relay mobility between the vehicle terminal 100 and the vehicle-carried moving object terminal 200 and share information related to mobility relay.

Figure 2:
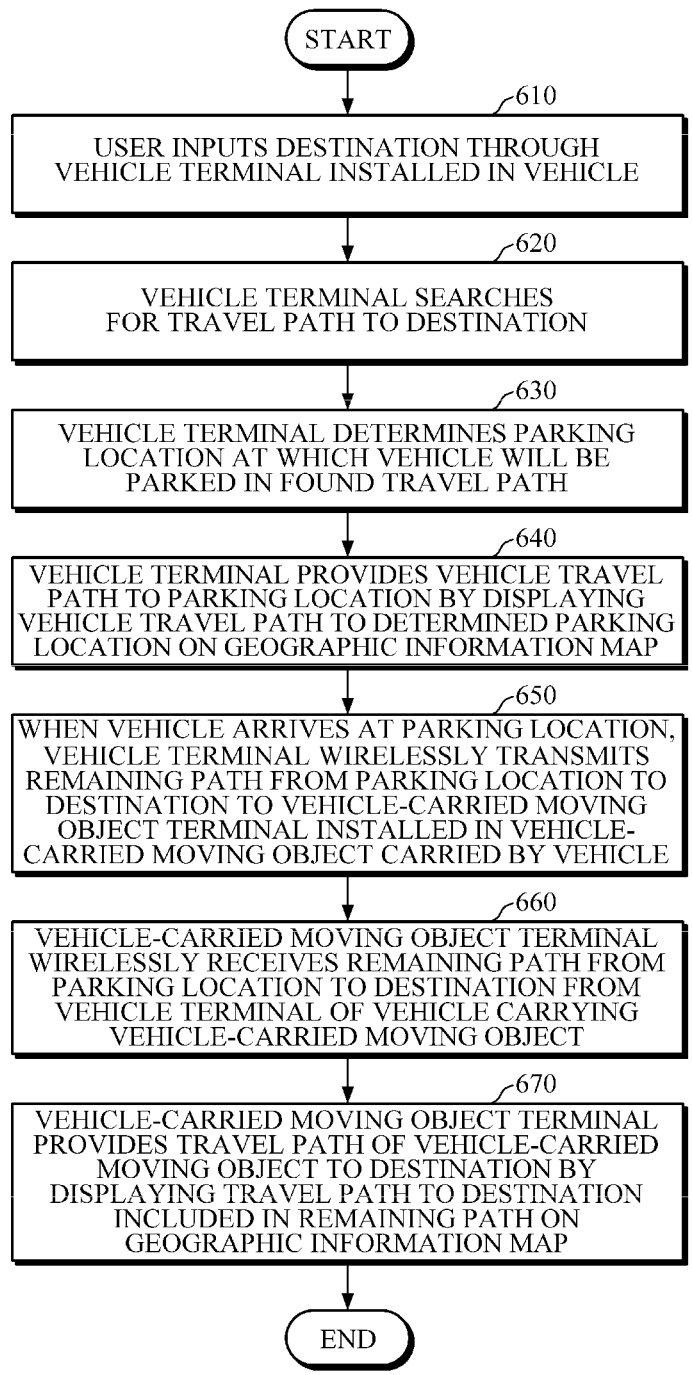
FIG. 2 is a flowchart illustrating an example of a mobility link operation of the smart mobility link system according to the present invention.

FIG. 2 is a flowchart illustrating an example of a mobility link operation of the smart mobility link system according to the present invention. First, when a user inputs a destination through the vehicle terminal 100 installed in a vehicle in an operation 610, the vehicle terminal 100 searches for a travel path to the destination in an operation 620.

Subsequently, in an operation 630, the vehicle terminal 100 determines a parking location at which the vehicle will be parked in a found travel path, and in an operation 640, the vehicle terminal 100 displays a vehicle travel path to the determined parking location on a geographic information map to provide a vehicle travel path to the parking location.

Subsequently, in an operation 650, when the vehicle arrives at the parking location, the vehicle terminal 100 wirelessly transmits a remaining path from the parking location to the destination to the vehicle-carried moving object terminal 200 installed in the vehicle-carried moving object carried by the vehicle.

Then, in an operation 660, the vehicle-carried moving object terminal 200 wirelessly receives the remaining path from the parking location to the destination from the vehicle terminal 100 of the vehicle which carries the vehicle-carried moving object, and in operation 670, the vehicle-carried moving object terminal 200 displays a travel path to the destination included in the remaining path on a geographic information map to provide a travel path of the vehicle-carried moving object to the destination.

According to such implementation of the present invention, a travel path is provided through a vehicle terminal installed in a vehicle, and mobility is relayed to a vehicle-carried moving object terminal which is installed in a vehicle-carried moving object over a remaining distance so that the travel path can be continuously provided. Accordingly, a user can be guided through a travel path even in an area in which vehicle travel is not possible without additional manipulation of the user.

Figure 3:
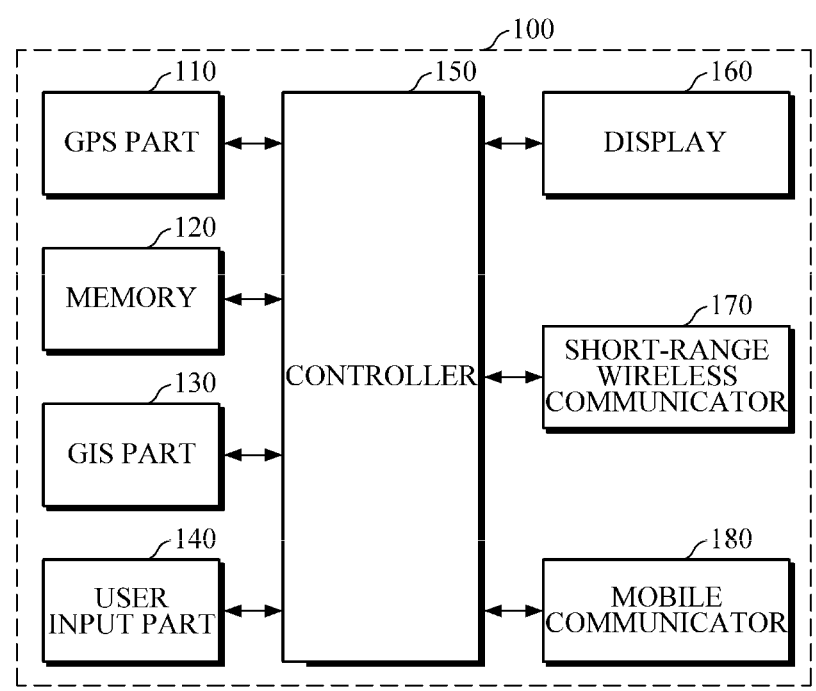
FIG. 3 is a block diagram of a vehicle terminal in a smart mobility link system according to one embodiment of the present invention.

FIG. 3 is a block diagram of a vehicle terminal in a smart mobility link system according to one embodiment of the present invention. As shown in FIG. 3, the vehicle terminal 100 according to the embodiment includes a global positioning system (GPS) part 110, a memory 120, a geographic information system (GIS) part 130, a user input part 140, a controller 150, and a display 160.

The GPS part 110 calculates a vehicle location. The GPS part 110 receives satellite signals from a plurality of GPS satellites and calculates a current location of the vehicle. A current location calculation technique employing GPS satellite signals is a well-known technology, and thus a detailed description thereof is omitted.

The memory 120 stores geographic information. For example, the memory 120 may be a non-volatile memory, such as an electrically erasable and programmable read-only memory (EEPROM) or a flash memory, but is not limited thereto.

The GIS part 130 provides the geographic information stored in the memory 120. A GIS is a well-known technology for digitizing geographic information of a country into a digital map and providing the digital map, and thus a detailed description thereof is omitted.

The user input part 140 receives a destination from a user. For example, the user input part 140 may be implemented in the form of a graphical user interface (GUI) which pops up in a touch screen to receive the destination through touch manipulation of the user.

The controller 150 controls the vehicle terminal 100 overall such as searching for a travel path to a destination, determining a parking location at which the vehicle will be parked in the travel path, and controlling display of a vehicle travel path to the parking location on a map. Such a control function may be implemented in the form of an application program.

Figure 4:
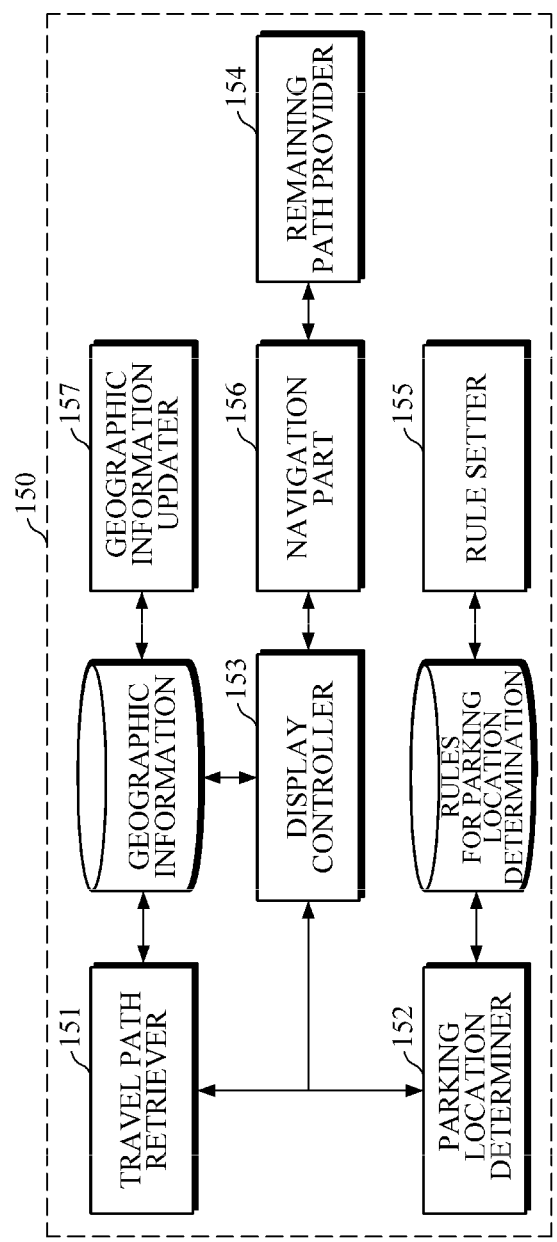
FIG. 4 is a block diagram of a controller of the vehicle terminal in the smart mobility link system according to one exemplary embodiment of the present invention.

FIG. 4 is a block diagram of a controller of a vehicle terminal in the smart mobility link system according to one embodiment of the present invention. The controller 150 may include a travel path retriever 151, a parking location determiner 152, a display controller 153, and a remaining path provider 154.

The travel path retriever 151 searches for a travel path from a current vehicle location calculated by the GPS part 110 to a destination input through the user input part 140. For example, the travel path retriever 151 may search for the travel path using current vehicle location coordinates and destination coordinates on a geographic information map.

Meanwhile, the travel path to the destination may be the shortest path from the current vehicle location to the destination or an optimal path which requires the shortest time to go from the current vehicle location to the destination. Such a path calculation technique is a well-known technology, and thus a detailed description thereof is omitted.

The parking location determiner 152 determines a parking location at which the vehicle will be parked in the travel path found by the travel path retriever 151. The parking location determiner 152 may determine the parking location according to rules for parking location determination.

For example, the rules for parking location determination may include whether parking is allowed, whether a vehicle-carried moving object is allowed, a time limit for arrival at the destination, a vehicle speed limit, and the speed of the vehicle-carried moving object. The rules for parking location determination may be automatically set with reference to geographic information or manually set through an input of the user.

Meanwhile, the parking location determiner 152 may determine the parking location in further consideration of traffic situation information. In this case, the parking location determiner 152 may change the parking location according to the traffic situation information.

For example, it may be determined that, when the user travels a long distance in the vehicle, an arrival time at the destination exceeds the time limit due to traffic jam. In this case, the determined parking location may be changed according to the rules for parking location determination so that the travel distance may be reduced.

The display controller 153 controls the vehicle travel path to the parking location determined by the parking location determiner 152 to be displayed on a geographic information map provided by the GIS part 130.

When the vehicle arrives at the parking location, the remaining path provider 154 provides a remaining path from the parking location to the destination to the vehicle-carried moving object terminal 200 installed in the vehicle-carried moving object carried by the vehicle.

The display 160 displays the geographic information map including the parking location under control of the controller 150. For example, the display 160 may be a display device such as a liquid crystal display (LCD), a light-emitting diode (LED) display, or an organic light-emitting diode (OLED) display.

According to such implementation of the present invention, a parking location is determined through the vehicle terminal 100 installed in a vehicle, and when the vehicle arrives at the parking location, a remaining path from the parking location to a destination is transmitted to the vehicle-carried moving object terminal 200 which is installed in a vehicle-carried moving object carried by the vehicle so that mobility information can be relayed from the vehicle terminal 100 to the vehicle-carried moving object terminal 200.

Meanwhile, according to an additional aspect of the present invention, the vehicle terminal 100 further includes a short-range wireless communicator 170. The short-range wireless communicator 170 wirelessly transmits the remaining path information provided by the remaining path provider 154 to the vehicle-carried moving object terminal 200.

For example, the short-range wireless communicator 170 may be wirelessly connected to the vehicle-carried moving object terminal 200 on the basis of Bluetooth or Wi-Fi to wirelessly transmit the remaining path information to the vehicle-carried moving object terminal 200, but the short-range wireless communicator 170 is not limited thereto.

According to such implementation of the present invention, the vehicle terminal 100 transmits remaining path information from a parking location to a destination to the vehicle-carried moving object terminal 200 using short-range wireless communication so that mobility can be relayed from the vehicle terminal 100 to the vehicle-carried moving object terminal 200.

Meanwhile, according to an additional aspect of the present invention, the controller 150 may further include a rule setter 155. The rule setter 155 sets rules for parking location determination. The rules for parking location determination may include whether parking is allowed, whether a vehicle-carried moving object is allowed, a time limit for arrival at the destination, a vehicle speed limit, and the speed of the vehicle-carried moving object.

For example, the rule setter 155 may automatically set rules for parking location determination with reference to geographic information provided by the GIS part 130 or may provide a user interface for setting rules for parking location determination so that rules for parking location determination may be input from the user through the user interface and manually set.

According to such implementation of the present invention, it is possible to set rules for parking location determination that the vehicle terminal 100 consults to determine a parking location, and the parking location determiner 152 can determine a parking location according to the rules for parking location determination.

Meanwhile, according to an additional aspect of the present invention, the vehicle terminal 100 may further include a mobile communicator 180. The mobile communicator 180 receives traffic situation information from the traffic management server 300. For example, the mobile communicator 180 may receive traffic situation information from the traffic management server 300 through third generation (3G), fourth generation (4G) long term evolution (LTE), or fifth generation (5G)-based mobile communication, but the mobile communicator 180 is not limited thereto.

According to such implementation of the present invention, when traffic situation information is received by the mobile communicator 180 from the traffic management server 300, the parking location determiner 152 may change a parking location determined on the basis of rules for parking location determination in consideration of the traffic situation information.

Meanwhile, according to an additional aspect of the present invention, the controller 150 may further include a navigation part 156. The navigation part 156 provides a vehicle travel path to the parking location.

According to such implementation of the present invention, the vehicle terminal 100 can provide a vehicle travel path to a parking location through the navigation part 156. When the vehicle arrives at a parking location, the vehicle terminal 100 relays mobility to the vehicle-carried moving object terminal 200 installed in the vehicle-carried moving object, and then a travel path of the vehicle-carried moving object is provided by the vehicle-carried moving object terminal 200.

Meanwhile, according to an additional aspect of the present invention, the controller 150 may further include a geographic information updater 157. The geographic information updater 157 receives geographic information from the geographic information providing server 400 through the mobile communicator 180 to update the geographic information stored in the memory 120.

According to such implementation of the present invention, geographic information which is continuously updated in the geographic information providing server 400 is downloaded through the geographic information updater 157 to update geographic information stored in the memory 120 so that geographic information stored in the vehicle terminal 100 can be kept up to date.

Figure 5:
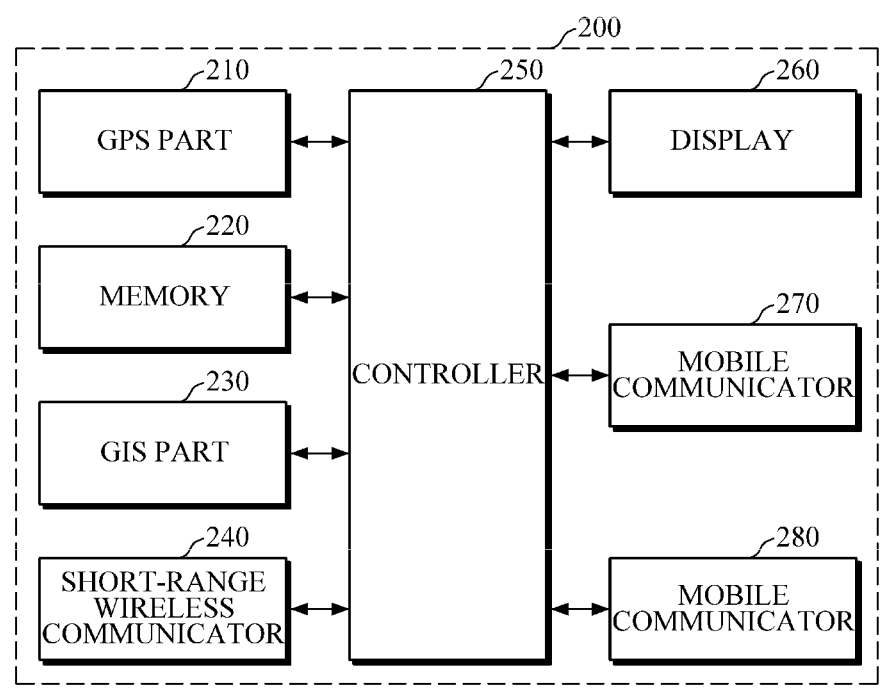
FIG. 5 is a block diagram of a vehicle-carried moving object terminal in the smart mobility link system according to one embodiment of the present invention.

FIG. 5 is a block diagram of a vehicle-carried moving object terminal in the smart mobility link system according to one embodiment of the present invention. As shown in FIG. 5, the vehicle-carried moving object terminal 200 according to the embodiment may be embedded in a battery of a vehicle-carried moving object (not shown) and includes a GPS part 210, a memory 220, a GIS part 230, a short-range wireless communicator 240, a controller 250, and a display 260.

The GPS part 210 calculates a vehicle-carried moving object location. The GPS part 210 receives satellite signals from a plurality of GPS satellites and calculates a current location of the vehicle-carried moving object. A current location calculation technique employing GPS satellite signals is a well-known technology, and thus a detailed description thereof is omitted.

The memory 220 stores geographic information. For example, the memory 220 may be a non-volatile memory, such as an EEPROM or a flash memory, but is not limited thereto.

The GIS part 230 provides the geographic information stored in the memory 220. A GIS is a well-known technology for digitizing geographic information of a country into a digital map and providing the digital map, and thus a detailed description thereof is omitted.

The short-range wireless communicator 240 wirelessly receives a remaining path from a parking location to a destination from the vehicle terminal 100 of a vehicle which carries the vehicle-carried moving object. For example, the short-range wireless communicator 240 may be wirelessly connected to the vehicle terminal 100 on the basis of Bluetooth or Wi-Fi to wirelessly receive the remaining path information from the vehicle terminal 100, but the short-range wireless communicator 240 is not limited thereto.

The controller 250 controls the vehicle-carried moving object terminal 200 overall such as controlling display of a travel path from the current vehicle-carried moving object location to the destination on a map. Such a control function may be implemented in the form of an application program.

Figure 6:
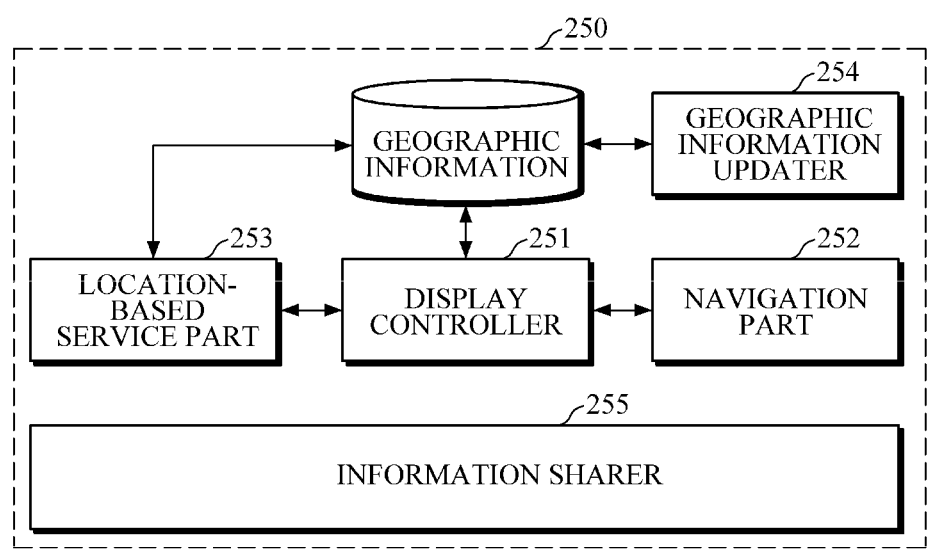
FIG. 6 is a block diagram of a controller of the vehicle-carried moving object terminal in the smart mobility link system according to one embodiment of the present invention.

FIG. 6 is a block diagram of a controller of a vehicle-carried moving object terminal in the smart mobility link system according to one embodiment of the present invention. The controller 250 includes a display controller 251.

The display controller 251 controls a travel path from the current vehicle-carried moving object location calculated by the GPS part 210 to the destination included in the remaining path received by the short-range wireless communicator 240 to be displayed on a geographic information map provided by the GIS part 230.

The display 260 displays the geographic information map including the destination under control of the controller 250. For example, the display 260 may be a display device such as an LCD, an LED display, or an OLED display.

According to such implementation of the present invention, the vehicle-carried moving object terminal 200 installed in a vehicle-carried moving object carried by a vehicle wirelessly receives a remaining path from a parking location to a destination from the vehicle terminal 100 installed in a vehicle which arrives at the parking location so that mobility information can be relayed from the vehicle terminal 100 to the vehicle-carried moving object terminal 200.

Meanwhile, according to an additional aspect of the present invention, the controller 250 may further include a navigation part 252. The navigation part 252 provides a travel path of the vehicle-carried moving object to the destination. The navigation part 252 may be implemented to change the travel path of the vehicle-carried moving object according to traffic situation information.

According to such implementation of the present invention, the vehicle-carried moving object terminal 200 can provide a travel path of the vehicle-carried moving object from a parking location to a destination through the navigation part 252.

Meanwhile, according to an additional aspect of the present invention, the vehicle-carried moving object terminal 200 may further include a mobile communicator 270. The mobile communicator 270 receives traffic situation information from the traffic management server 300.

For example, the mobile communicator 270 may receive traffic situation information from the traffic management server 300 through 3G, 4G LTE, or 5G-based mobile communication, but the mobile communicator 270 is not limited thereto.

According to such implementation of the present invention, when traffic situation information is received by the mobile communicator 270 from the traffic management server 300, the navigation part 252 may change a travel path of the vehicle-carried moving object in consideration of the traffic situation information.

Meanwhile, according to an additional aspect of the present invention, the controller 250 may further include a location-based service part 253. The location-based service part 253 provides a location-based service regarding surroundings of the current vehicle-carried moving object location on the basis of the geographic information provided by the GIS part 230.

The location-based service regarding surroundings of the vehicle-carried moving object location denotes a service for informing a user of places, such as cafes, restaurants, and tourist sites, present within a specific distance from the current location of a vehicle-carried moving object by displaying the places on a geographic information map.

According to such implementation of the present invention, the location-based service part 253 informs a user of a vehicle-carried moving object about places, such as cafes, restaurants, and tourist sites, present within a specific distance from the current location of the vehicle-carried moving object so that the user can use the location-based service.

Meanwhile, according to an additional aspect of the present invention, the controller 250 may further include a geographic information updater 254. The geographic information updater 254 receives geographic information from the geographic information providing server 400 through the mobile communicator 270 and updates the geographic information stored in the memory 220.

According to such implementation of the present invention, geographic information which is continuously updated in the geographic information providing server 400 is downloaded through the geographic information updater 254 to update geographic information stored in the memory 220 so that geographic information stored in the vehicle-carried moving object terminal 200 can be kept up to date.

Meanwhile, according to an additional aspect of the present invention, the controller 250 may further include an information sharer 255. The information sharer 255 transmits collection information of the vehicle-carried moving object terminal 200 to the vehicle terminal 100 through the short-range wireless communicator 240. The collection information of the vehicle-carried moving object terminal 200 may be travel information of the vehicle-carried moving object or exercise information of a vehicle-carried moving object user, but the collection information of the vehicle-carried moving object terminal 200 is not limited thereto.

Such information may be shared between the vehicle-carried moving object terminal 200 and the vehicle terminal 100 not directly but through an additional mobility management server (not shown).

According to such implementation of the present invention, the vehicle-carried moving object terminal 200 can share information related to use of a vehicle-carried moving object, such as travel information of the vehicle-carried moving object or exercise information of a vehicle-carried moving object user, with the vehicle terminal 100 through the information sharer 255.

Meanwhile, according to an additional aspect of the present invention, the vehicle-carried moving object terminal 200 may further include an information collector 280. The information collector 280 collects collection information of the vehicle-carried moving object terminal 200. The collection information of the vehicle-carried moving object terminal 200 may be travel information of the vehicle-carried moving object or exercise information of a vehicle-carried moving object user, but the collection information of the vehicle-carried moving object terminal 200 is not limited thereto.

As an example, the information collector 280 may be a rotation sensor which acquires travel information of the vehicle-carried moving object, such as travel speed and travel distance of the vehicle-carried moving object, by sensing rotation speed and the number of rotations of wheels of the vehicle-carried moving object.

As another example, the information collector 280 may be a calorie consumption calculator which acquires exercise information of a vehicle-carried moving object user by calculating calorie consumption of the vehicle-carried moving object user's pedaling.

According to such implementation of the present invention, it is possible to collect collection information of the vehicle-carried moving object terminal 200, such as travel information of the vehicle-carried moving object or exercise information of a vehicle-carried moving object user, through the information collector 280.

As described above, according to the present invention, a travel path is provided through a vehicle terminal installed in a vehicle, and mobility is relayed to a vehicle-carried moving object terminal which is installed in a vehicle-carried moving object over a remaining distance so that the travel path can be continuously provided. Accordingly, a user can be guided through a travel path even in an area in which vehicle travel is not possible without additional manipulation of the user, and thus it is possible to achieve the above-described object of the present invention.

The present invention can be industrially used in technical fields related to mobility management and applied technology fields thereof.

Embodiments disclosed herein and illustrated in the drawings are set forth as the specific examples only to aid in understanding and are not intended to limit the scope of various embodiments of the present invention.

Accordingly, the scope of various embodiments of the present invention should be interpreted to encompass all alterations and modifications derived from the technical spirit of various embodiments of the present invention as well as the above-described embodiments.

What is claimed is:

1. A smart mobility link system comprising a vehicle terminal, wherein the vehicle terminal comprises:
    a processor; and
    a memory configured to store geographic information and program instructions;
    wherein the program instructions, when executed by the processor, implement:
        a global positioning system (GPS) module configured to calculate a vehicle location;
        a geographic information system (GIS) module configured to provide the geographic information stored in the memory;
        a user input module configured to receive a destination from a user; and
        a controller comprising a travel path retrieval module configured to search for a travel path from a current vehicle location calculated by the GPS module to the destination received through the user input module, a parking location determining module configured to determine a parking location at which a vehicle will park in the travel path found by the travel path retrieval module, a display controlling module configured to control a vehicle travel path to the parking location determined by the parking location determining module to be displayed on a geographic information map provided by the GIS module, and a remaining path providing module configured to provide a remaining path from the parking location to the destination to a vehicle-carried moving object terminal installed in a vehicle-carried moving object carried by the vehicle based on a detection of arrival of the vehicle at the parking location,
    a display configured to display the geographic information map including the parking location under control of the controller, and
    a short-range wireless communicating module configured to wirelessly transmit remaining path information provided by the remaining path providing module to the vehicle-carried moving object terminal,
    wherein the parking location determining module is configured to determine the parking location according to traffic situation information and rules for parking location determination, which include whether parking is allowed, whether a vehicle-carried moving object is allowed, a time limit for arrival at the destination, a vehicle speed limit, and speed of the vehicle-carried moving object,
    wherein when an arrival time at the destination is determined to exceed the time limit, the parking location determining module changes the parking location and reduces a travel distance, and
    wherein an initial travel path provided by the travel path retrieval module comprises a first section from the current location to an intermediate point and a second section from the intermediate point to the destination, and the vehicle is able to travel from the current location to the intermediate point and not able to travel from the intermediate point to the destination.

2. The smart mobility link system of claim 1, wherein the controller further comprises a rule setting module configured to set the rules for parking location determination.

3. The smart mobility link system of claim 1, wherein the controller further comprises a geographic information updating module configured to receive geographic information from a geographic information providing server through the mobile communicating module and update the geographic information stored in the memory.

4. The smart mobility link system of claim 1, further comprising the vehicle-carried moving object terminal, wherein the vehicle-carried moving object terminal comprises:
    a processor; and
    a memory configured to store geographic information and program instructions;
    wherein the program instructions, when executed by the processor, implement:
        a global positioning system (GPS) module configured to calculate a vehicle-carried moving object location;
        a geographic information system (GIS) module configured to provide the geographic information stored in the memory;
        a short-range wireless communicating module configured to wirelessly receive a remaining path from a parking location to a destination from a vehicle terminal of a vehicle which carries a vehicle-carried moving object based on a detection of arrival of the vehicle at the parking location; and
        a controller comprising a display controlling module configured to control a travel path from a current vehicle-carried moving object location calculated by the GPS module to the destination included in the remaining path received by the short-range wireless communicating module to be displayed on a geographic information map provided by the GIS module,
    wherein the vehicle-carried moving object terminal further comprises a display configured to display the geographic information map including the destination under control of the controller,
    wherein the vehicle-carried moving object terminal is installed in the vehicle-carried moving object.

5. The smart mobility link system of claim 4, wherein the controller further comprises a navigation module configured to guide a user along a travel path of the vehicle-carried moving object to the destination.

6. The smart mobility link system of claim 5, wherein the navigation module is configured to change the travel path of the vehicle-carried moving object according to traffic situation information.

7. The smart mobility link system of claim 6, wherein the vehicle-carried moving object terminal further comprises a mobile communicating module configured to receive the traffic situation information from a traffic management server.

8. The smart mobility link system of claim 7, wherein the controller further comprises a geographic information updating module configured to receive geographic information from a geographic information providing server through the mobile communicating module and update the geographic information stored in the memory.

9. The smart mobility link system of claim 4, wherein the controller further comprises an information sharing module configured to transmit collection information of the vehicle-carried moving object terminal to the vehicle terminal for sharing.

10. The smart mobility link system of claim 9, wherein the vehicle-carried moving object terminal further comprises an information collecting module configured to collect the collection information of the vehicle-carried moving object terminal.

11. The smart mobility link system of claim 10, wherein the collection information of the vehicle-carried moving object terminal is travel information of the vehicle-carried moving object or exercise information of a vehicle-carried moving object user.

12. The smart mobility link system of claim 4, wherein the vehicle-carried moving object terminal is embedded in a battery of the vehicle-carried moving object.

13. The smart mobility link system of claim 1, wherein the controller further comprises a navigation module configured to guide the user along the vehicle travel path to the parking location.

14. The smart mobility link system of claim 4, wherein the controller further comprises a location-based service module configured to provide a location-based service regarding surroundings of the current vehicle-carried moving object location on the basis of the geographic information provided by the GIS module.

15. The smart mobility link system of claim 1, wherein the initial travel path is provided to the user through the display on the geographic information map.

16. The smart mobility link system of claim 1, wherein the intermediate point is the parking location.

* * * * *